United States Patent

[11] 3,574,291

| [72] | Inventor | Guenter K. Rosendahl |
| | | Arlington Heights, Ill. |
| [21] | Appl. No. | 762,921 |
| [22] | Filed | Sept. 26, 1968 |
| [45] | Patented | Apr. 13, 1971 |
| [73] | Assignee | Illinois Tool Works, Inc. |
| | | Chicago, Ill. |

[54] PACKAGING APPARATUS
7 Claims, 10 Drawing Figs.

[52] U.S. Cl. .................................................. 83/175,
53/282, 83/255, 83/408, 83/423, 83/449, 221/71
[51] Int. Cl. .................................................. B26d 7/14
[50] Field of Search.......................................... 53/167,
282, 182, 175; 83/165, 149, 104, 255, 278, 409,
423, 408, 444, 449, 175; 221/71

[56] References Cited
UNITED STATES PATENTS
| 2,810,652 | 1957 | Armbruster.................. | 221/71UX |
| 2,896,387 | 1959 | Brock........................... | 53/182X |
| 3,112,590 | 1963 | O'Brien........................ | 53/182X |
| 3,180,191 | 1965 | Midgley....................... | 83/104X |

*Primary Examiner*—Andrew R. Juhasz
*Assistant Examiner*—James F. Coan
*Attorneys*—Olson, Trexler, Wolters and Bushnell, Robert W. Beart, Michael Kovac, Barry L. Clark and Jack R. Halvorsen ABSTRACT: There is disclosed an apparatus for feeding interconnected packages along a path of travel, and guide means for directing the packages downwardly from said path of travel in a manner such that gravity causes the leading packages to move down the guide means and pull the following packages onto the guide means. A cutting mechanism is positioned adjacent the guide means for severing successive packages from the row while leaving sufficient interconnected packages on the guide means to maintain the desired pull on the following packages.

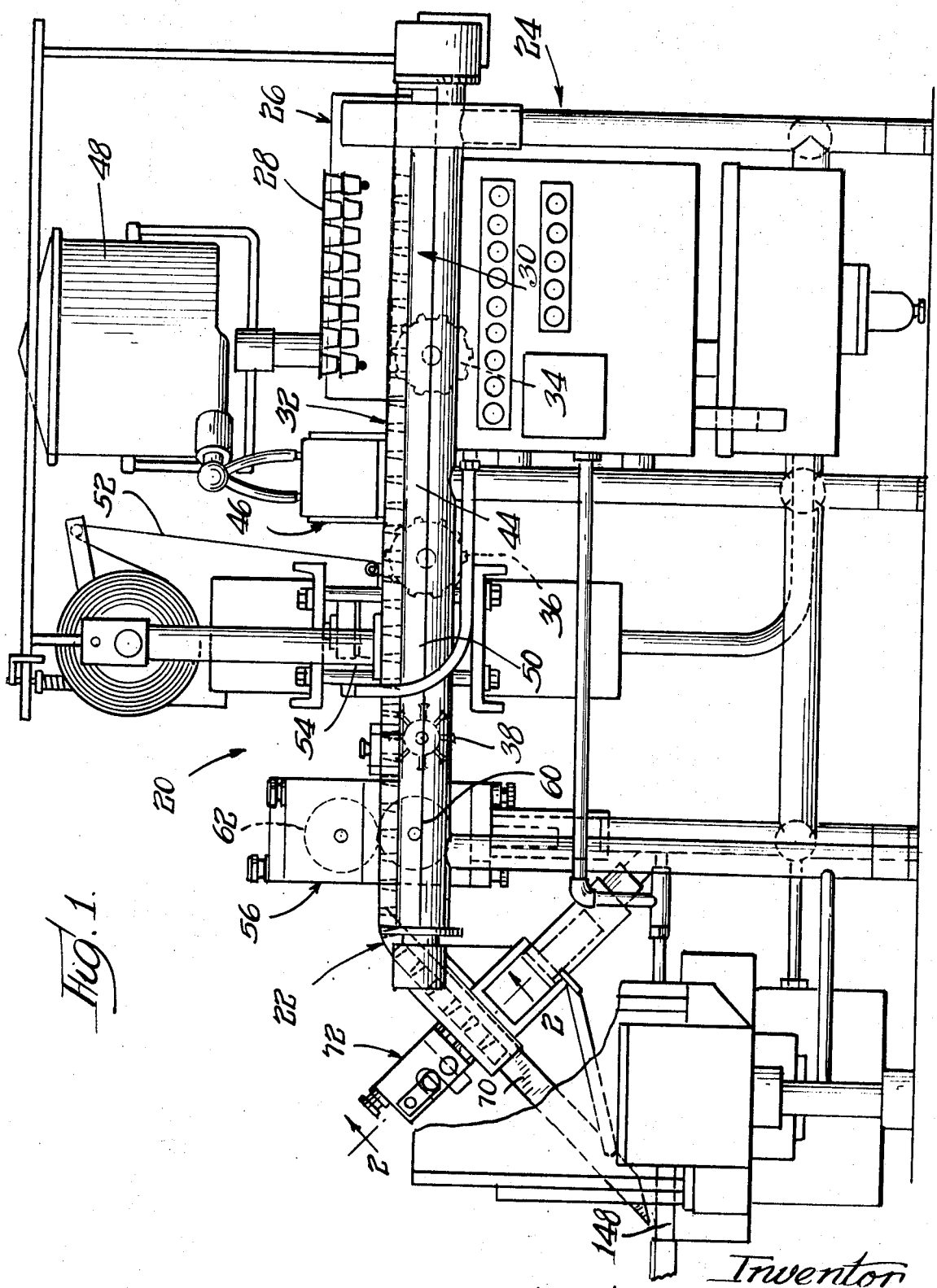

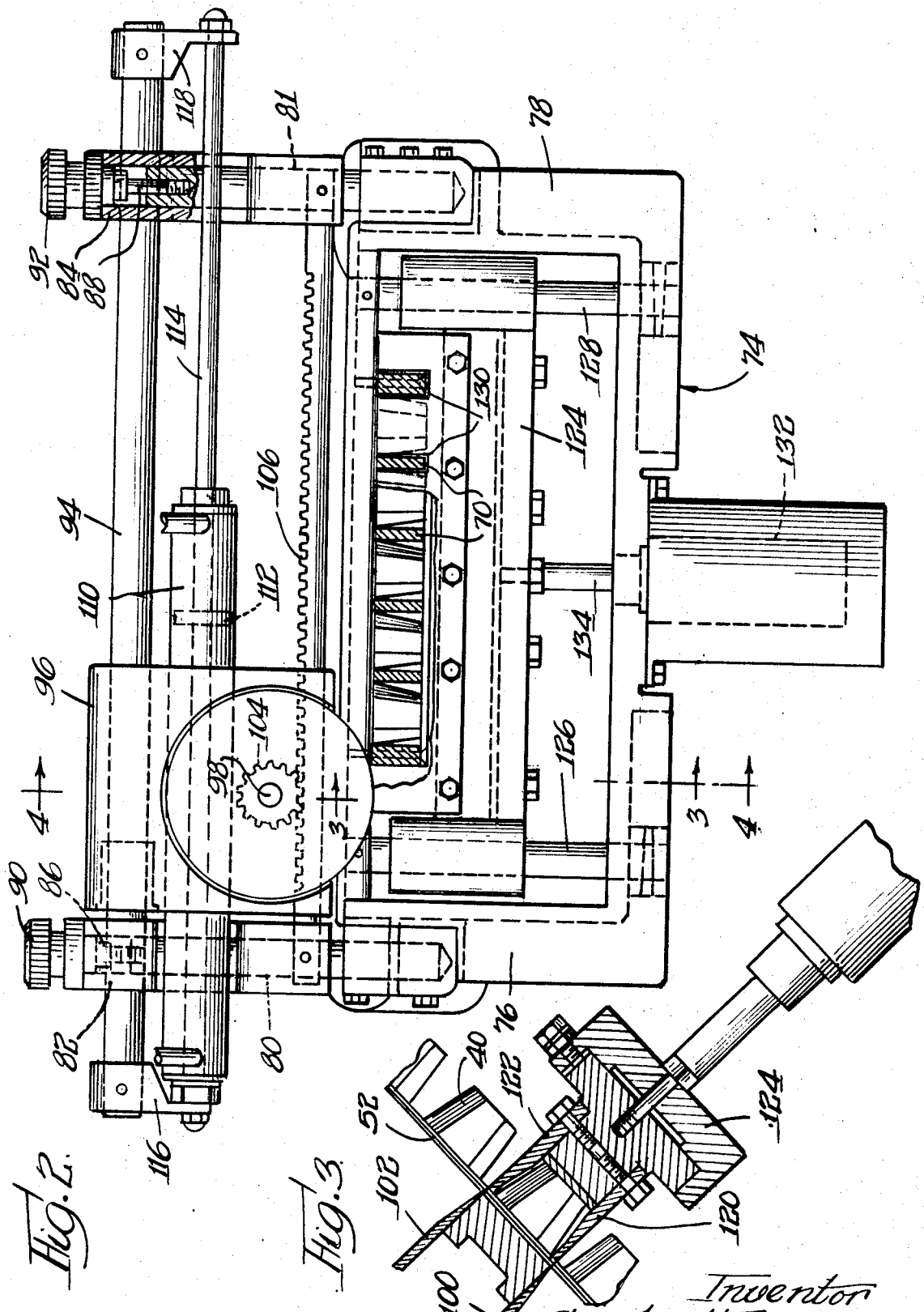

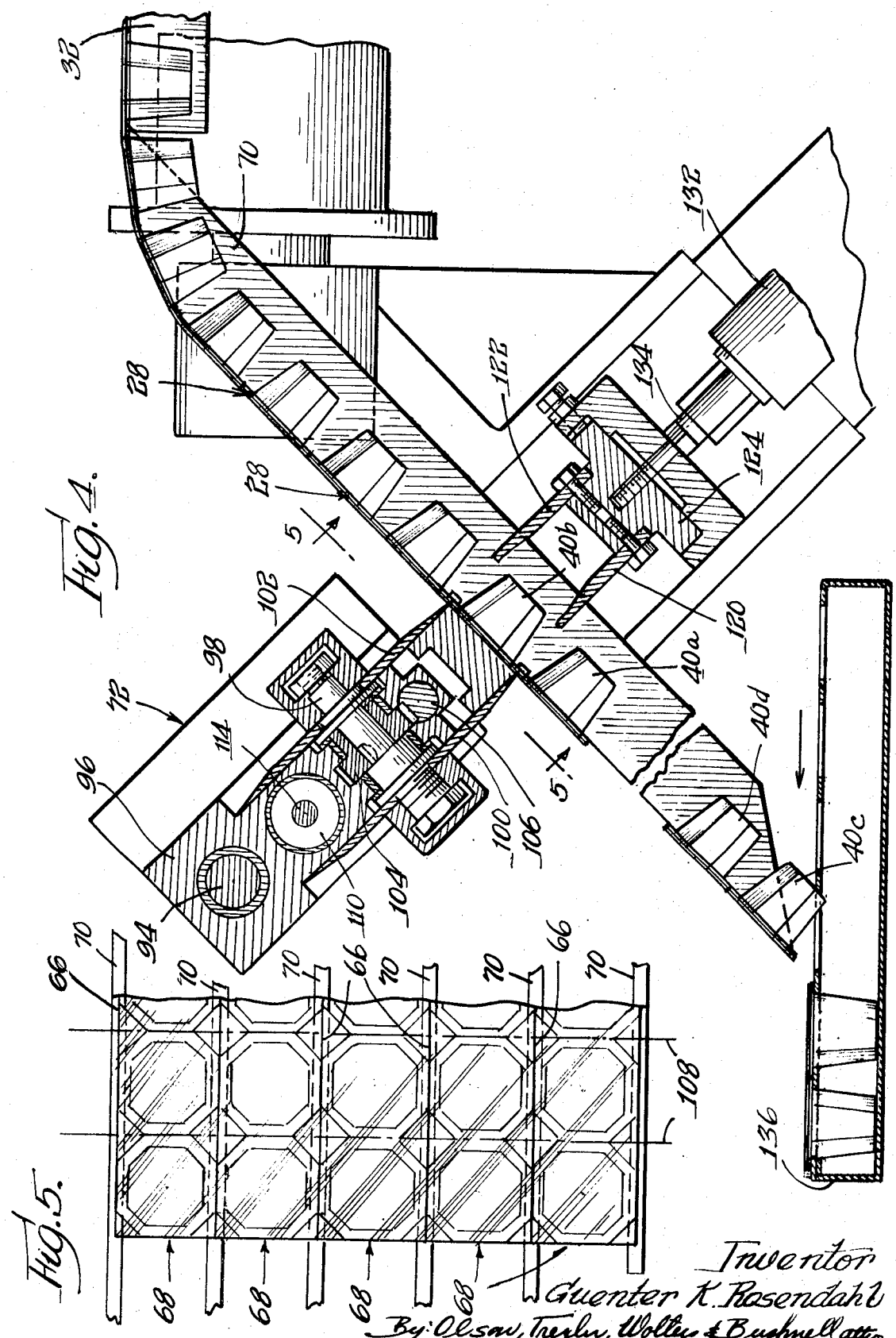

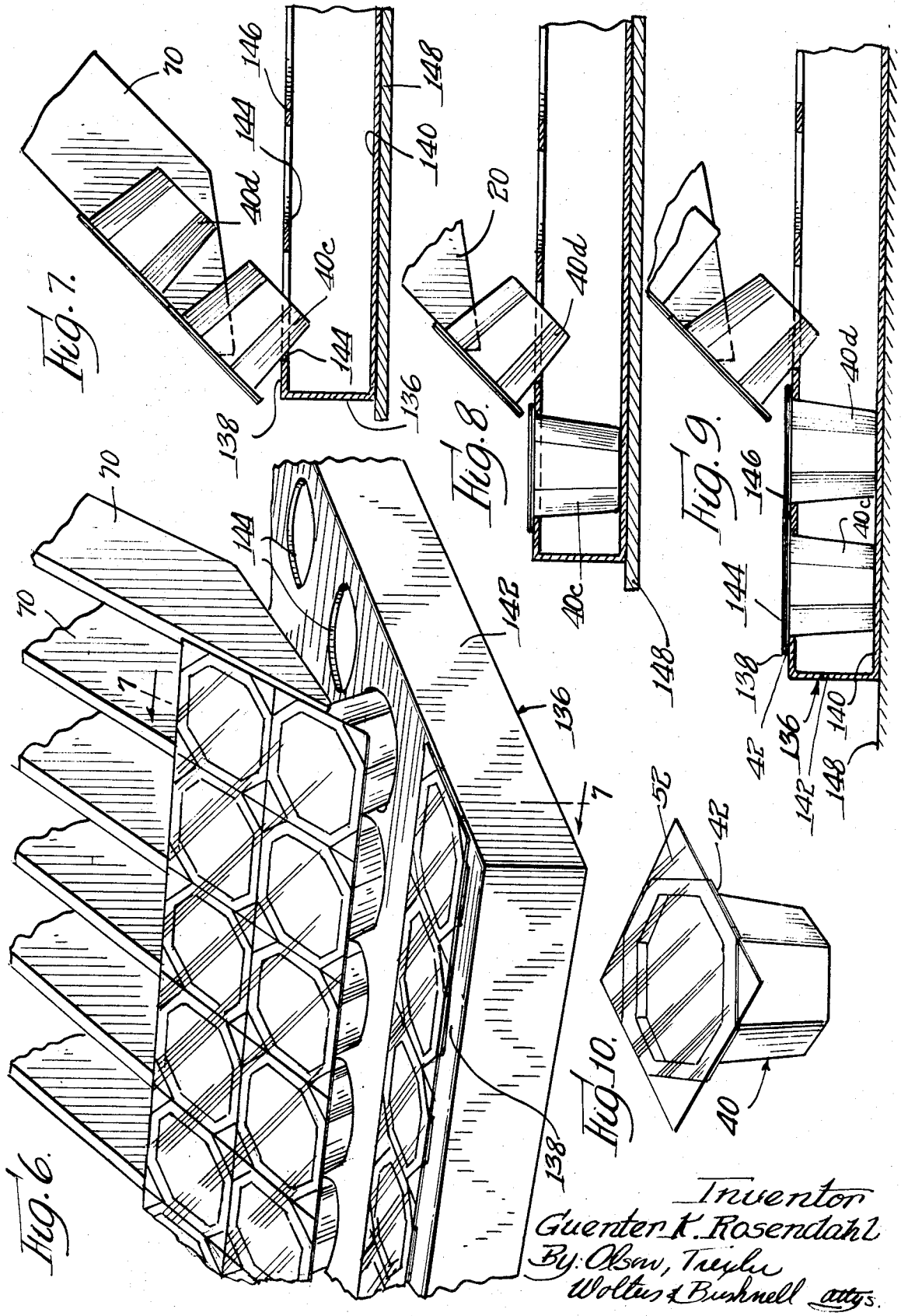

PACKAGING APPARATUS

The present invention relates to a novel packaging apparatus, and more specifically to a novel apparatus for processing a plurality of packages interconnected in rows and subsequently severing the packages from each other and depositing them at a suitable point of discharge.

While certain features of the present invention may be adapted for inclusion in packaging apparatus of various constructions, one embodiment is especially adapted for a packaging apparatus including other features disclosed and claimed in an application by Guenter K. Rosendahl, Ser. No. 762,749 filed simultaneously herewith.

It is an important object of the present invention to provide a novel apparatus for forming or processing initially interconnected packages and subsequently separating the packages and feeding them to a discharge station in a simplified and efficient manner.

A more specific object of the present invention is to provide a novel apparatus of the above-described type wherein one or more longitudinally extending rows of interconnected packages are advanced by suitable conveying means along a generally horizontal path of travel past processing stations, which apparatus includes package discharge means comprising downwardly extending guide means for enabling leading packages in such rows to be fed toward a discharge station by gravity, and severing means arranged adjacent said guide means for separating leading packages from such rows at locations such that sufficient interconnected packages remain on said guide means for pulling and thereby feeding by gravity subsequent packages onto the guide means.

Other objects and advantages of the present invention will become apparent from the following description and the accompanying drawings wherein:

FIG. 1 is a side elevational view showing a packaging apparatus incorporating features of the present invention;

FIG. 2 is an enlarged fragmentary sectional view taken generally along line 2—2 in FIG. 1;

FIG. 3 is a further enlarged fragmentary sectional view taken generally along line 3—3 in FIG. 2;

FIG. 4 is a fragmentary partial sectional view taken generally along line 4—4 in FIG. 2;

FIG. 5 is a fragmentary view taken generally along line 5—5 in FIG. 4;

FIG. 6 is a fragmentary perspective view showing the manner in which packages are deposited from downwardly extending guide means into a package receiving container;

FIG. 7 is a fragmentary sectional view taken along line 7—7 in FIG. 6.

FIGS. 8 and 9 are views similar to FIG. 7 but showing the manner in which packages are deposited from lower ends of downwardly inclined guide means into a container as the container is advanced beneath the guide means; and FIG. 10 is a perspective view showing a container of the type which may be processed by apparatus of the present invention.

Referring now more specifically to the drawings wherein like parts are designated by the same numerals throughout the various FIGS., an apparatus 20 incorporating features of the present invention is shown in FIG. 1. The present invention is primarily concerned with means for feeding, guiding and severing packages from each other at a discharge end portion 22 of the apparatus and this means will be described in detail below. For a more complete description of other portions of the apparatus and the functioning thereof reference is made to the aforementioned Rosendahl application.

In general, the apparatus 20 comprises a frame structure 24 having a loading mechanism 26 mounted adjacent one end thereof for retaining a supply of package units 28 and successively depositing such units at a loading station 30 onto means for conveying the units substantially horizontally along a path of travel extending longitudinally of the apparatus. This conveying means is disclosed fully in the aforementioned Rosendahl application and comprises a longitudinally extending rail or guide bar structure 32 engageable beneath the container units 28 and driven sprocket wheels 34, 36 and 38 disposed at spaced intervals along the path of travel and engageable with individual elements in the container units 28.

As shown best in FIGS. 1—5 and 10, each of the container units 28 comprises a plurality of individual cup-shaped containers 40 arranged in transverse and longitudinally extending rows. These containers have upper marginal flanges 42 which are initially interconnected. In the embodiment shown, each unit 28 has five containers 40 in each transverse row and six containers 40 in each longitudinally extending row. Of course, the unit 28 may be modified so as to contain any desired number and arrangement of containers and the apparatus will be correspondingly modified.

The individual container units 28 are advanced from the loading station 30 to a filling station 44 at which a mechanism 46 is mounted for dispensing predetermined quantities of the material to be packaged. For example, the mechanism may be adapted for dispensing milk or other food products stored in a chamber 48.

The filled containers are advanced by the conveying means to a closing and sealing station 50. A continuous sheet or web 52 of suitable plastic is fed into position over the open upper end of the containers 40 and is heat sealed or otherwise secured thereto by a mechanism 54. It is understood that the closure sheet 52 is sufficiently wide to cover all of the containers 40 in the container unit 28. Since the sheet 52 is continuous, the containers 40 and successive units 28 are all connected with each other as they leave the station 50. Thus, the sprocket wheel 38 which is located downstream of the path of travel from the station 50 serves to pull the container units 28 and sheet 52 from the station 50 and to push these elements on along the path of travel.

A cutting mechanism 56 is disposed at a first cutting or severing station 60 adjacent the sprocket wheel 38. This mechanism comprises sets of upper and lower cooperable cutter discs 62 and 64 disposed for severing the closed and sealed containers from each other along line 66 shown in FIG. 5 and extending longitudinally of the path of travel. For a more complete disclosure of this cutting mechanism reference is made to the aforementioned Rosendahl application. The arrangement is such that the containers leaving the severing station are in the form of a plurality of longitudinally extending rows 68 with the containers in each row interconnected with each other but separate from the containers in an adjacent row.

In accordance with features of the present invention, the apparatus is provided with a plurality of guide bars or rails 70 which, as shown best in FIGS. 1 and 4, are mounted at the discharge end of the previously mentioned guide means 32 and extend at a relatively sharp angle downwardly therefrom. Thus, as leading packages in each of the rows 68 pass from the generally horizontal path of travel provided by the guide means 32 onto the downwardly inclined path of travel defined by the guide bars or rails 70, the force of gravity serves to cause such packages to slide down the guide bars 70. In other words, the force of gravity functions to advance the packages along the downwardly inclined path of travel. In addition, the gravity force tending to cause the leading packages in each of the rows 68 is transmitted through the interconnecting top sheet to the trailing packages still on the horizontal guide means 32 so that this force functions to pull the packages from the sprocket 38 through the cutter means 56 and onto the downwardly inclined guide bars.

A severing mechanism 72 is mounted for traversing the downwardly inclined path of travel and separating leading packages from the rows 68. As shown in FIGS. 1 and 4, the severing mechanism 72 is located substantially below the junction of the guide bars 70 with the guide means 32 so that there is sufficient space between the severing mechanism and this junction to accommodate several interconnected packages in each row 68. In other words, the severing mechanism is located so that after each severing or cutting operation which will be described below, a sufficient number of the packages on the downwardly inclined guide bars remain interconnected with each other to insure a combined downward pull adequate to effect feeding of the following containers from the horizontal guide means onto the downwardly inclined guide means.

As shown in FIGS. 1—4, the severing mechanism 72 comprises a generally U-shaped frame member 74 interconnected with the frame means 24 of the apparatus and extending beneath the guide bars or rails 70. The U-shaped member has opposite upstanding arms 76 and 78 embracing the downwardly extending guide rails. Rods 80 and 81 have lower ends secured in sockets in the arms 76 and 78 and extend upwardly therefrom for slidably adjustably supporting bracket members or blocks 82 and 84. Adjusting screws 86 and 88 respectively having hand knobs 90 and 92 rotatably interconnected with the blocks 82 and 84 are threaded into the upper ends of the rods 80 and 81. Thus, upon turning of the hand knobs 90 and 92, the blocks 82 and 84 may be shifted toward or away from the U-shaped frame member for adjusting cutting blades with respect to the packages to be severed in the manner described below.

A guide bar 94 extends between the blocks or bracket members 82 and 84 as shown in FIGS. 2 and 4. This guide bar slidably supports a carriage 96 in which is rotatably mounted a shaft 98. Rotary cutter blades 100 and 102 are fixed on the shaft 98 for rotation therewith. A pinion 104 is also fixed on the shaft and meshes with a rack 106 extending between and mounted on the blocks 82 and 84. Thus, upon movement of the carriage 96, the blades 100 and 102 are rotated for severing leading packages from the rows 68. As shown in FIGS. 4 and 5, the blades 100 and 102 are positioned for severing a pair of endmost packages indicated by the reference numerals 40a and 40b from each of the rows 68 by cutting along lines 108 extending transversely of the rows 68.

In order to actuate the carriage 96 back and forth across the path of travel of the packages, a double acting fluid cylinder 110 is fixed thereto. This cylinder cooperates with a piston 112 secured on a fixed rod 114 extending through the cylinder and having its opposite ends secured by brackets 116 and 118 to opposite ends of the rod 94.

Backup blade members 120 and 122 are provided for supporting the containers from beneath and generally along the lines 108 and thereby cooperating with the blades 100 and 102 in severing the packages. The backup blade members 120 and 122 are secured to a crosshead 124 having opposite ends slidably supported by guide rods 126 and 128 so that the backup blade members may be reciprocated from the raised work supporting position shown in FIGS. 2 and 3 to a retracted position shown in FIG. 4 located to enable the packages to clear the upper edges of the backup blades and to advance down the guide bars 70 between severing operations. Suitable slots 130, see FIG. 2, are formed in the backup blades for providing clearance for the guide rails 70 when the backup blades are in the raised position. A double acting air or fluid cylinder 132 is mounted on the frame member and actuates the piston rod 134 connected with the crosshead 124 for raising and lowering the backup blades.

The apparatus is provided with suitable control circuit means so that the various mechanisms are actuated in timed relationship. Reference is made to the aforementioned Rosendahl application for a disclosure of such control circuit means. It suffices to state herein that the apparatus is operated so that the containers are intermittently advanced by the generally horizontally disposed conveying means to and then past the various processing stations. The containers also intermittently advance down the inclined guide rails 70 to the mechanism 72. The cylinders 110 and 132 of this mechanism are intermittently operated in timed relationship with the remainder of the apparatus so as to sever two leading packages from each row 68 during each severing operation. More specifically, the cylinder 132 is first operated so that the backup blades 120 and 122 are positioned in the raised position whereupon the cylinder 110 is operated to cause the rotary blades to traverse the packages of row 68. Then the cylinder 132 is operated so as to retract the backup blades 120 and 122 to permit the severed packages 40 to slide down the guide bars and the next packages to slide into position to be acted upon by the blades during the next severing operation.

As indicated, upon the completion of a severing operation and the retraction of the backup blade to the position shown in FIG. 4, the completely severed leading pair of containers 40c and 40d in each row 68 slide down the guide rails 70 a desired point of discharge. In the embodiment shown, it is contemplated that the severed packages will be deposited in a container 136 as shown in FIGS. 4 and 6—9. The container is in the form of a box or carton having top and bottom sections 138 and 140 interconnected by upstanding side sections 142. The top section is formed with a plurality of apertures or pockets 144 separated by web portions 146 for receiving lower ends of the containers. The construction is such that when the packages are fully assembled with the carton, the upper marginal flanges 42 overlie the web portions 146.

The cartons 136 are supported by conveying means 148 indicated generally in FIG. 1. This conveying means is actuated in timed relationship with the remainder of the apparatus but need not be described in detail. The conveying means may, for example, be in the form of an intermittently operated endless belt or reciprocable pusher elements for advancing the cartons along guide rails. In the embodiment shown, the arrangement is such that the cartons are advanced along a generally horizontal path of travel beneath the lower ends of the downwardly inclined guide rails 70.

The manner in which the packages are deposited in the carton 136 is shown best in FIGS. 7—9. Referring particularly to FIG. 7, it is seen that the carton 136 is initially positioned relative to the ends of the guide rails 70 so that a first pocket or aperture 144 is in alignment with the downwardly inclined path of travel of the packages. The arrangement is such that when a pair of separated packages 40c and 40d slide to the lower ends of the guide rails 70, the package 40c initially engages and may be stopped by the forward edge of the aperture 144. Then the apparatus is actuated so as to index the carton 136 from the position shown in FIG. 7, through the position shown in FIG. 8 and to the position shown in FIG. 9. In other words, the carton is indexed so as to advance two of the package receiving packets past the lower ends of the guide rails 70. As this movement takes place, the first package 40c drops into the first pocket as shown in FIG. 8 whereupon the second package 40d slides down the guide rails and initially engages the forward edge of the next pocket. Further movement of the carton during the completion of the indexing step allows the package 40d to disengage from the lower terminal ends of the guide rails 70 and fall into the carton as shown in FIG. 9, whereupon another pair of severed packages slide down the guide rails from the severing mechanism 72 so as to be in position for deposit into the carton during the next indexing movement thereof.

The angular relationship between the guide rails 70 or, in other words, the downwardly inclined path of travel of the packages and the conveyor 148 and the path of travel of the carton 136 is preferably in the neighborhood of about 45°. This angle is correlated with the distance between the conveyor 148 and the lower terminal ends of the guide rails 70 and the dimensions of the packages and of the carton 136 so that when a package such as the package 40c initially engages the forward edge of a carton pocket as shown in FIG. 7, gravity tends to cause the package to pivot toward the right as viewed in FIG. 7 so as to drop into the pocket automatically upon advancement of the carton.

While a preferred embodiment of the present invention has been shown and described herein, it is obvious that many structural details may be changed without departing from the spirit and scope of the appended claims.

I claim:

1. In an apparatus for packaging material, the combination comprising means for conveying a longitudinally extending row of interconnected packages along a predetermined path of travel, guide means inclined downwardly from a junction with said path of travel for receiving and guiding said interconnected packages, leading packages in said row being advanced down said guide means under the influence of gravity and being initially restrained by interconnection with trailing packages engaged by said conveying means, a means mounted adjacent said guide means for successively severing endmost packages on said guide means from said row for enabling said severed packages to travel freely down said guide means under the influence of gravity, said conveying means and said guide means including elements for conveying and guiding a plurality of side by side longitudinally extending rows of interconnected packages, and said severing means comprising rotary cutter means, and means for moving said rotary cutter means back and forth across said plurality of rows.

2. A combination, as defined in claim 1, wherein said conveying means comprises a member for engaging and pushing packages in said row at a location spaced substantially from said junction of the guide means with the path of travel, the weight of the interconnected packages on said guide means maintaining packages remaining on said path of travel between said member and said junction under tension.

3. A combination, as defined in claim 1, wherein said means for severing packages is located substantially below said junction so that remaining interconnected packages on said guide means after severing of leading endmost packages have sufficient weight to pull trailing interconnected packages on said path of travel down onto said inclined guide means.

4. A combination, as defined in claim 1, wherein said severing means includes backup blade means disposed for engaging the packages oppositely from said rotary cutter means, means supporting said backup blade means for movement into and out of engagement with the packages, and means for actuating said rotary cutter means and said backup blade means.

5. In an apparatus for packaging material and discharging such packages, the combination comprising means for conveying a longitudinally extending row of interconnected packages along a generally horizontal path of travel, guide means inclined downwardly from a junction with said path of travel for receiving and guiding said interconnected packages, leading packages in said row being advanced down said guide means by gravity and initially being restrained by interconnection with trailing packages, means mounted adjacent said guide means for successively severing leading endmost packages on said guide means from said row at a location spaced below said junction so that a portion of the interconnected packages remains on said guide means after each leading endmost package is severed, said guide means comprising spaced apart guide rails engageable beneath opposite marginal portions of the packages, which packages have body portions projecting between the rails, said rails having lower terminal discharge ends, and means for supporting containers beneath said ends for receiving successive packages sliding down said rails.

6. A combination, as defined in claim 5, wherein said conveying means comprises means for intermittently indexing said row of packages to advance a predetermined plural number of the packages to the severing means, and said severing means comprises a plurality of blade elements corresponding to said predetermined plural number for simultaneously severing said plural number of packages from said row.

7. A combination, as defined in claim 5, wherein said conveying means comprises guide rail means and rotatable package engageable members spaced along said guide rail means for advancing the packages past a filling mechanism, a sealing mechanism at which the rows of packages are joined transversely as well as longitudinally, and a severing mechanism for severing the longitudinally extending rows of packages from each other.